United States Patent Office

2,849,362
Patented Aug. 26, 1958

2,849,362

FUMIGANT COMPOSITIONS COMPRISING 3-BROMOPROPYNE AND 1,3-DICHLOROPROPENE

Charles R. Youngson, Long Beach, and Cleve A. I. Goring, Garden Grove, Calif., assignors to The Dow Chemical Company, Midland, Mich., a corporation of Delaware No Drawing. Application February 1, 1957
Serial No. 637,605

9 Claims. (Cl. 167—39)

The present invention relates to fumigant compositions and is particularly concerned with a new fumigant composition and an agronomical practice for improving the ability of soil to support plant growth.

It is an object of the present invention to provide a new fumigant composition. A further object is to supply a new agronomical practice and composition for improving the plant growing properties of soil and the ability of soil to support the growth of crops. Another object is the provision of a new method and composition for treating soil to obtain improved controls of soil dwelling invertebrate organisms such as wire worms and nematodes. A further object is the provision of a new method and composition for improving the emergence, seedling growth and the harvest of crop plants. An additional object is the provision of a new method and composition for treating soil which will accomplish the stimulation of the growth of crops. Other objects will become apparent from the following specification and claims.

The new fumigant composition of the present invention comprises about 1 part by weight of 3-bromopropyne in admixture with from about 0.3 to 4 parts by weight of 1,3-dichloropropene. While this composition advantageously may be employed in many types of fumigation operations, it conveniently adapts itself to the treatment of soil or other growth media to improve the ability of the soil to support plant growth and to benefit the plants grown in the treated soil. Such practice protects the plants from the ravages of soil-dwelling invertebrate organisms which attack their roots and improves the growth and harvest of crop plants. It has also been found that the treatment accomplishes changes in the soil which stimulate the growth and improve the growth characteristics of crops grown therein. It is among the advantages of the present invention that the toxicants in the mixture appear to be mutually activating so that a greater than additive or synergistic result is accomplished as regards the effect on the plant growing properties of the soil and the control of insect and other undesirable organisms and particularly invertebrates such as wire worms and nematodes.

The composition comprising the mixture of toxicants is sufficiently increased in effectiveness so as to permit the effective utilization of reduced amounts of 3-bromopropyne and of 1,3-dichloropropene on soil and the obtaining of crop yields and controls of soil-dwelling organisms which are much superior to those obtained when either of the constituents of the mixture is employed alone. An additional advantage is that these reduced effective dosages of the mixture of toxicants materially reduce the hazards of soil residues. Thus, the practice of the present invention provides a very desirable economic advantage for the agriculturalist.

3-bromopropyne and 1,3-dichloropropene are mobile liquids boiling at 88°–90° C. and 107°–111° C. at atmospheric pressure, respectively. Mixtures of the compounds are soluble in many organic solvents and of low solubility in water and are adapted to be readily and conveniently distributed in soil. It is among the advantages of the present invention that mixtures of the compounds, while sufficiently persistent to accomplish the desired effect upon the soil and upon the soil inhabiting organisms, dissipate in a reasonable period of time. Still another advantage is that mixtures of these compounds permeate soil for a distance of several inches from the point of application depending upon the temperature, organic content, moisture content, compactness and physical consistency of the soil or growth media.

In carrying out the improved agronomic practice of the invention, the 3-bromopropyne and 1,3-dichloropropene may be mixed together and employed directly for the treatment of soil. However, the present invention also embraces the employment of gaseous, liquid or dust compositions containing the mixture of toxicants and for any fumigant purpose where the composition is valuable. Thus, the toxicant mixture may be dissolved in a suitable liquid carrier to provide compositions adapted to be distributed in soil. Such liquid compositions may also be employed to fumigate the surfaces of certain fruits, vegetables and grains, where these products tolerate the fumigation action. Similarly, the 3-bromopropyne and 1,3-dichloropropene may be dispersed together on or in a granular or finely divided solid carrier to provide compositions adapted to be distributed in soil or employed as concentrates and subsequently diluted with additional inert carrier to produce the ultimate treating compositions. In a further mode of operation, the 3-bromopropyne and 1,3-dichloropropene may be blended with a suitable surface-active dispersing agent with or without one or more liquid carriers to provide concentrates suitable for dispersion in water to prepare soil treating compositions in the form of aqueous dispersions or emulsions.

The compositions of the invention may be prepared in any suitable fashion. Since the 3-bromopropyne and 1,3-dichloropropene compounds are miscible in all proportions, compositions without carriers may be prepared by simple mixing of the components at ordinary temperatures. In the preparation of compositions containing a liquid organic carrier, the 3-bromopropyne and 1,3-dichloropropene components are thoroughly mixed in the liquid organic carrier at ordinary temperatures. Suitable liquid organic carriers include liquid aliphatic and aromatic hydrocarbons such as toluene, xylenes, naphthas and hydrocarbon mixtures derived from the distillation of petroleum or coal. For some fumigation operations such carriers as carbon tetrachloride or ethylene dichloride may be employed. In general, it is preferred to avoid liquid carriers having such low flash points as to constitute a fire hazard or such high boiling points as to leave undesired residues after use of the compositions.

In a preferred embodiment of the invention, selected petroleum distillates are employed as liquid carriers. Depending upon the concentration of the mixture of toxicants, such augmented compositions are adapted to be distributed in the soil or otherwise, or employed as concentrates and subsequently diluted with additional carrier to produce the ultimate treating compositions. Petroleum distillates used in such embodiment are carefully fractionated portions boiling almost entirely under 400° F. at atmospheric pressure and having a flash point above about 80° F. These fumigant compositions are characterized by having excellent penetrating properties and by being of low fire hazard to the shipper and user.

In the preparation of dispersible concentrate compositions, the 3-bromopropyne and 1,3-dichloropropene components are mixed together in the proportions previously set forth together with a surface-active dispersing agent soluble in the composition with or without the further addition of a liquid organic carrier. The surface active agents are usually employed in the amount of from 1 to 20 percent by weight of the combined weight of the toxicant mixture and surface active agent. Suitable surface-active dispersing agents include polyoxyalkylene derivatives of alcohols, phenols and organic acids, oil-soluble petroleum sulfonates and polyoxyethylene derivatives of glycerol, glycols and the like.

In compositions in which the 3-bromopropyne and 1,3-dichloropropene components are dispersed on or in a granulated or finely divided solid carrier, said components may be added directly to the solid carrier with mechanical mixing. Alternatively, the components may be combined with one or more of the aforementioned liquid organic carriers and the resulting compositions admixed with the solid carrier. Suitable solid carriers include silica gel, woodflour, fuller's earth, chalk or gypsum and the like.

In formulating the compositions, it is essential to maintain the proportions of from about one part by weight of 3-bromopropyne to from about 0.3 to 4 parts by weight of 1,3-dichloropropene and to provide an effective amount of said mixture in the finished composition in order to obtain the desired synergistic effect. The concentration of the mixture of toxicants in organic solvent compositions employed to supply the desired dosage is generally from about 10 to 85 percent by weight. With aqueous compositions, the required dosage is generally supplied with compositions containing from 1 to 50 percent, although concentrations of 0.0002 percent by weight conveniently may be employed in irrigation treatments of soil. In compositions wherein the active mixture is dispersed on the solid carrier, it is generally desirable to employ from about 1 to about 30 percent by weight of the above mixture of active ingredients in the finished solid composition. With high capacity carriers, such as silica gel, the active ingredients may amount to 50 percent by weight or more of the solid composition. In any case, it is desirable to employ sufficient of the solid carrier so that the liquid composition is adsorbed or absorbed to provide a free-flowing solid mixture. In compositions to be employed as concentrates the toxicant mixture oftentimes is present in a concentration of from about 5 to 95 percent by weight.

The soil may be treated with the toxicant mixture or a composition containing the mixture of toxicants in any suitable fashion. With liquid compositions, good results have been obtained by depositing the active fumigant mixture at regular intervals beneath the surface of the soil. Such deposition may be accomplished readily by automatic machinery or by hand-operated apparatus. Thus, the active composition may be sprayed or otherwise deposited in a furrow which is subsequently closed to keep the active agents in the desired zone of the soil to be treated. Alternatively, the liquid compositions may be injected into the soil at predetermined intervals. In any case, the active composition is usually deposited at a depth of from about 4 to 18 inches below the soil surface.

In row treatments it is advantageous to place the fumigant composition at least 12 inches below the surface of the seed bed and to seal in the fumigant by listing the soil or by other suitable means such as ring rollers or press sealers attached behind the applicator. In overall applications with chisel type applicators, the fumigant composition may be applied in uniform treatments 1 to 12 inches apart at a depth of 6 to 8 inches. With plow sole applications, it is desirable to employ about 8 inches spacing between the furrows and to spray or otherwise introduce the fumigant composition so as to cover the bottom of the furrow. Where injection of the active composition at intervals is employed, good results are obtained when injecting at intervals of from 3 to about 12 inches, although somewhat greater intervals may be employed in certain cases. In the above operations, it is desirable to apply the fumigant composition after the soil has been worked into seed bed condition and when the soil temperature is above 50° F. and the soil moisture content is sufficient for seed germination.

In another mode of operation, the fumigant composition in emulsifiable form may be dispersed in water employed to irrigate the soil. In this method, the amount of water may be varied in accordance with the porosity and water-holding capacity of the soil in order to obtain the desired depth of distribution of the toxicant mixture.

The amounts of the 3-bromopropyne and 1,3-dichloropropene composition to be employed will vary depending upon such factors as the type and condition of the soil, the varieties and growth stages of soil pests to be controlled and the particular crop to be planted thereafter. The essential criterion is to employ an amount for accomplishing the desired effect upon the soil dwelling invertebrate organisms and the plant growing properties of the soil. In general, good results are obtained when the mixture of toxicants is distributed in growth media to a depth of from 4 to 12 inches at a dosage of at least one pound per acre. In field applications, the mixture of toxicants is usually introduced into the soil at a depth of about 6 inches and at a dosage of from 1 to 50 pounds per acre. When compositions embodying a liquid or solid carrier are used, the amount of composition is adjusted to distribute substantially the above-described amounts of the active toxicant mixture per acre. The required amount of the toxicant mixture in the soil may conveniently be supplied per acre treated in from about 10 to 100 gallons of organic solvent carrier, in from 10 to 162,000 gallons or more of the aqueous carrier or in from about 50 to 1,000 pounds or more of the solid carrier.

When operating in accordance with the present invention, it is generally desirable to allow at least about 10 days after application of the active composition before planting the treated area to a crop. During such period, the fumigant mixture, after accomplishing its desired effects, is dissipated from the soil by processes such as leaching, volatilization and chemical degradation. If high dosages of the active composition are employed or if the temperature remains below about 60° C. or the soil is sealed by heavy rains or irrigation, a somewhat longer waiting period is desirable before planting. When employing high dosages or following periods of low temperature or high soil moisture, it is sometimes desirable to work the soil by harrowing or tilling several days before planting in order to facilitate the dissipation of the fumigant composition from the soil.

The following examples illustrate the invention but are not to be construed as limiting:

*Example 1*

1,3-dichloropropene and 3-bromopropyne were dissolved in acetone to produce the following compositions:

| Composition | Amount of toxicant in grams per liter of acetone | |
|---|---|---|
| | 1,3-dichloropropene | 3-bromopropyne |
| A | 1.5 | |
| B | | 0.5 |
| C | 1.5 | 0.5 |

These compositions were employed for the treatment of sandy loam soil heavily infested with root-knot nematodes. In such operations, the soil was placed in sealable containers and thereafter treated with the compositions by injection to give various dosages of toxicant per acre foot of soil. The containers of treated soil were then sealed and set aside for one week. Containers of untreated soil were similarly sealed and set aside to serve as checks.

Following the latter period, the containers were unsealed and the soil allowed to aerate for one week and thereafter planted with tomato seeds. During the subsequent growing period, there was observed no adverse effect upon the growth of the seedlings attributable to the presence of residual toxicant. About 7 weeks after planting, the plants were lifted from the soil and the roots washed and examined for gall formation attributable to nematode attack. The results obtained together with the dosages at which the toxicants were employed are set forth in the following table:

| Composition | Dosage of toxicant in pounds per acre foot of soil | | Percent control of nematodes |
| --- | --- | --- | --- |
| | 1,3-dichloropropene | 3-bromopropyne | |
| A | 3.0 | | 19 |
| B | | 1.0 | 0 |
| C | 3.0 | 1.0 | 75 |

In the check plots which received no treatment, the plants were found to be dwarfed and their roots covered with galls attributable to nematode attack.

*Example 2*

1,3-dichloropropene and 3-bromopropyne were dissolved in acetone to produce the following compositions:

| Composition | Amount of toxicant in grams per liter of acetone | |
| --- | --- | --- |
| | 1,3-dichloropropene | 3-bromopropyne |
| A | 0.25 | |
| B | | 0.25 |
| C | 0.25 | 0.25 |

These compositions were employed for the treatment of sandy loam soil heavily infested with root-knot nematodes. In such operations, the soil was placed in sealable containers and thereafter treated with the compositions by injection to give various dosages of toxicant per acre foot of soil. The containers of treated soil were then sealed and set aside for one week. Containers of untreated soil were similarly sealed and set aside to serve as checks.

Following the latter period, the containers were unsealed and the soil allowed to aerate for about one week and thereafter planted with tomato seeds. During the subsequent growing period, there was observed no adverse effect upon the growth of the seedlings attributable to the presence of residual toxicant. About 7 weeks after planting, the plants were lifted from the soil and their roots washed and examined for gall formation attributable to nematode attack. The results obtained together with the dosages at which the toxicants were employed are set forth in the following table:

| Composition | Dosage of toxicant in pounds per acre foot of soil | | Percent control of nematodes |
| --- | --- | --- | --- |
| | 1,3-dichloropropene | 3-bromopropyne | |
| A | 0.5 | | 0 |
| B | | 0.5 | 3 |
| C | 0.5 | 0.5 | 72 |

In the check plots which receive no treatment, the tomato plants were found to be dwarfed and their roots heavily galled as a result of nematode attack.

*Example 3*

1,3-dichloropropene and 3-bromopropyne were dissolved in acetone to produce the following compositions:

| Composition | Amount of toxicant in grams per liter of acetone | |
| --- | --- | --- |
| | 1,3-dichloropropene | 3-bromopropyne |
| A | 0.25 | |
| B | | 0.75 |
| C | 0.25 | 0.75 |

These compositions were employed for the treatment of sandy loam soil heavily infested with root-knot nematodes. In such operations, the soil was placed in sealable containers and thereafter treated with the compositions by injection to give various dosages of toxicant per acre foot of soil. The containers of treated soil were then sealed and set aside for one week. Containers of untreated soil were similarly sealed and set aside to serve as checks.

Following the latter period, the containers were unsealed and the soil allowed to aerate for about one week and thereafter planted with tomato seeds. During the subsequent growing period, there was observed no adverse effect upon the growth of the seedlings attributable to the presence of residual toxicant. About 7 weeks after planting, the plants were lifted from the soil and the roots washed and examined for gall formation attributable to nematode attack. The results obtained together with the dosages at which the toxicants were employed are set forth in the following table:

| Composition | Dosage of toxicant in pounds per acre foot of soil | | Percent control of nematodes |
| --- | --- | --- | --- |
| | 1,3-dichloropropene | 3-bromopropyne | |
| A | 0.5 | | 0 |
| B | | 1.5 | 61 |
| C | 0.5 | 1.5 | 89 |

The tomato plants in the check plots which received no treatment were stunted and their roots heavily covered with galls resulting from nematode attack.

*Example 4*

Twenty parts by weight of 1,3-dichloropropene, 47 parts of 3-bromopropyne, 30 parts of xylene and 3 parts of a dimeric alkylated aryl poly ether alcohol (Triton X-155) are mixed together to prepare a concentrate composition in the form of an emulsifiable liquid.

In a further operation, 30 parts by weight of 1,3-dichloropropene, 20 parts by weight of 3-bromopropyne, 48 parts of xylene and 2 parts of an alkyl aryl sulfonate are mechanically mixed together to produce an emulsifiable concentrate composition.

Also, 1,3-dichloropropene and 3-bromopropyne are dissolved in a low boiling petroleum hydrocarbon fraction (Stoddard solvent) to produce a composition having a flash point greater than 100° F. and containing about 10 percent by weight of each of the toxicant compounds. The hydrocarbon solvent has a boiling range of from about 325° to 390° F. and a flash point of about 116° F.

In an additional operation, 1,3-dichloropropene and 3-bromopropyne are dissolved in Standard Thinner 250 to produce a fumigant composition containing 15 percent by weight of 1,3-dichloropropene and 5 percent by weight of 3-bromopropyne. Standard Thinner 250 is a petroleum hydrocarbon fraction boiling at from 192° to 272° F.

The concentrate compositions as above described are adapted to be dispersed in water to produce aqueous compositions having very desirable wetting and penetrating properties. The latter aqueous compositions and the above described solvent fumigant compositions are adapted to be employed to treat soil and to distribute the mixture of toxicants therein in effective concentrations.

*Example 5*

The emulsifiable concentrate composition described in Example 4 as with Triton X–155 is dispersed in water to produce a composition containing 25 pounds of the mixture of toxicant per 200 gallons of ultimate mixture. This composition, while under agitation, is metered into irrigation water at the pump outlet at the rate of two gallons per 1000 gallons of irrigation water. The water is in a state of turbulent flow as it comes from the pump which provides for the thorough mixing of the toxicants therein. About two acre-inches of irrigation water is applied per acre to land heavily infested with wire worms and root-knot nematodes to accomplish a wetting of the soil to a depth of about six inches. Two weeks after the treatment the soil is planted with tomatoes. In a check operation, adjacent but similarly infested soil is also planted with tomatoes. Eight weeks after seeding, the plots are inspected and representative plants lifted from the soil and the roots examined for evidence of wire worm and nematode attack. The examination indicates a commercial control of both soil organisms in the treated soil with severe infestation in the check plots.

We claim:

1. A fumigant composition comprising as active toxic ingredients from about 1 part by weight of 3-bromopropyne and from about 0.3 to 4 parts by weight of 1,3-dichloropropene, the active toxic ingredients of said composition being mutually activating.

2. A fumigant composition comprising a carrier and dispersed therein as active toxic ingredients from about 1 part by weight of 3-bromopropyne and from about 0.3 to 4 parts by weight of 1,3-dichloropropene, the active toxic ingredients of said composition being mutually activating.

3. A composition comprising as active toxic ingredients from about 1 part by weight of 3-bromopropyne and from about 0.3 to 4 parts by weight of 1,3-dichloropropene in intimate admixture with an adjuvant selected from the group consisting of (A) finely divided inert solids, (B) emulsifying and dispersing agents, and (C) petroleum distillates, the amount of such adjuvants employed in the compositions being from 70 to 99 percent by weight for (A), from 1 to 20 percent by weight for (B), and from 15 to 90 percent by weight for (C).

4. A composition claimed in claim 3 wherein the active toxic ingredients are admixed with a finely divided inert solid.

5. A composition claimed in claim 3 wherein the active toxic ingredients are admixed with a petroleum distillate.

6. A composition claimed in claim 3 wherein the active toxic ingredients are admixed with a surface-active dispersing agent.

7. A fumigant composition which comprises an aqueous dispersion of the composition claimed in claim 6, the mixture of active toxic ingredients being present in the amount of at least 0.0002 percent by weight.

8. In the practice of agricultural economy, the method which comprises impregnating soil with a parasiticidal dosage of a composition comprising from about 1 part by weight of 3-bromopropyne and from about 0.3 to 4 parts by weight of 1,3-dichloropropene.

9. In the practice of agricultural economy, the method which comprises impregnating soil with a parasiticidal dosage of a composition comprising as active toxic ingredients from about 1 part by weight of 3-bromopropyne and from about 0.3 to 4 parts by weight of 1,3-dichloropropene in intimate admixture with a petroleum distillate.

References Cited in the file of this patent

UNITED STATES PATENTS 2,749,377 Johnston ............... June 5, 1956

FOREIGN PATENTS 913,365 France ................. Sept. 5, 1946
124,387 Australia .............. June 12, 1947

OTHER REFERENCES

Chem. Abstracts, vol. 47, page 488a (1953).

Wadley, "The Evidence Required To Show Synergistic Action of Insecticides and a Short Cut in Analysis," U. S. Dept. of Agri. Publication ET–223, June 1945 (7 pp.).